US012093059B2

(12) United States Patent
Takahashi et al.

(10) Patent No.: US 12,093,059 B2
(45) Date of Patent: Sep. 17, 2024

(54) CONTROL SYSTEM, CONTROL APPARATUS, AUTONOMOUS WORK MACHINE, OPERATION METHOD OF CONTROL APPARATUS, CONTROL METHOD OF AUTONOMOUS WORK MACHINE, AND STORAGE MEDIUM

(71) Applicant: HONDA MOTOR CO., LTD., Tokyo (JP)

(72) Inventors: Hiroto Takahashi, Wako (JP); Makoto Yamamura, Wako (JP); Takamasa Udagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 500 days.

(21) Appl. No.: 17/326,882

(22) Filed: May 21, 2021

(65) Prior Publication Data
US 2021/0286376 A1 Sep. 16, 2021

Related U.S. Application Data

(63) Continuation of application No. PCT/JP2018/043889, filed on Nov. 29, 2018.

(51) Int. Cl.
*G05D 1/00* (2024.01)
*B60L 53/66* (2019.01)
*B60L 58/12* (2019.01)
*H02J 7/00* (2006.01)

(52) U.S. Cl.
CPC .......... *G05D 1/0291* (2013.01); *B60L 53/665* (2019.02); *B60L 58/12* (2019.02);
(Continued)

(58) Field of Classification Search
CPC .............. G05D 1/0291; G05D 1/0088; G05D 2201/0208; B60L 58/12; B60L 53/665; B60L 2200/40; H02J 7/0071
See application file for complete search history.

(56) References Cited

U.S. PATENT DOCUMENTS

| 8,527,197 B2 | 9/2013 | Poncelet Born Morey |
| 9,242,571 B2 | 1/2016 | Fukui et al. |

(Continued)

FOREIGN PATENT DOCUMENTS

| DE | 202013101894 U1 | 8/2014 |
| JP | 2009116634 A * | 5/2009 |

(Continued)

OTHER PUBLICATIONS

English Machine Translation of JP-2009116634-A (Year: 2009).*
(Continued)

*Primary Examiner* — Andrew J Cromer
(74) *Attorney, Agent, or Firm* — Thomas | Horstemeyer, LLP (57) ABSTRACT

A control system including a charging station, a plurality of autonomous work machines, and a control apparatus configured to control the plurality of autonomous work machines, wherein the control apparatus comprises: an obtain unit configured to obtaining power information of each autonomous work machine; and a control unit configured to control each autonomous work machine based on the power information such that charging timings of the autonomous work machines at the charging station do not match each other.

21 Claims, 7 Drawing Sheets

(52) U.S. Cl.
CPC .......... *G05D 1/0088* (2013.01); *H02J 7/0071* (2020.01); *B60L 2200/40* (2013.01)

(56) References Cited

U.S. PATENT DOCUMENTS

| | | | |
|---|---|---|---|
| 2011/0142099 A1 | 6/2011 | Poncelet Born Morey | |
| 2015/0258910 A1* | 9/2015 | Fukui | H02J 7/00036 701/22 |
| 2019/0357431 A1 | 11/2019 | Kamfors et al. | |
| 2021/0286376 A1* | 9/2021 | Takahashi | A01B 69/00 |

FOREIGN PATENT DOCUMENTS

| | | |
|---|---|---|
| JP | 2014-187766 A | 10/2014 |
| JP | 2017-040076 A | 2/2017 |
| JP | 2018-000021 A | 1/2018 |
| WO | 2014/021412 A | 2/2014 |
| WO | 2018/135988 A1 | 7/2018 |
| WO | 2020/110247 A1 | 6/2020 |

OTHER PUBLICATIONS

Extended European Search Report for European Patent Application No. 18941660.5 mailed Sep. 27, 2021.

Rappaport Micha et al: "Coordinated Recharging of Mobile Robots during Exploration", 2017 IEEE/RSJ International Conference on Intelligent Robots and Systems (IROS), IEEE, Sep. 24-28, 2017 (Sep. 24, 2017), pp. 6809-6816, XP033266751, Vancouver, BC, Canada.

International Search Report for PCT/JP2018/043889 mailed Feb. 5, 2019.

\* cited by examiner

CONTROL SYSTEM, CONTROL APPARATUS, AUTONOMOUS WORK MACHINE, OPERATION METHOD OF CONTROL APPARATUS, CONTROL METHOD OF AUTONOMOUS WORK MACHINE, AND STORAGE MEDIUM

CROSS-REFERENCE TO RELATED APPLICATION(S)

This application is a continuation of International Patent Application No. PCT/JP2018/043889 filed on Nov. 29, 2018, the entire disclosure of which is incorporated herein by reference.

BACKGROUND OF THE INVENTION

Field of the Invention

The present invention relates to a control system, a control apparatus, an autonomous work machine, an operation method of the control apparatus, a control method of the autonomous work machine, and a storage medium.

Description of the Related Art

Conventionally, one autonomous work machine (for example, a lawn mower or a snow remover) is operated in combination with one charging station. PTL 1 discloses a work machine that, when the remaining power amount of the work machine decreases, automatically returns to a charging station to charge its battery.

CITATION LIST

Patent Literature

PTL 1: Japanese Patent Laid-Open No. 2017-40076

If a plurality of autonomous work machines operate in a single work area and share one charging station, timings at which these need charging may overlap. As a result, some autonomous work machines are set in a charging wait state, and the work efficiency lowers.

The present invention provides a technique for avoiding occurrence of a charging wait state of an autonomous work machine and improving work efficiency.

SUMMARY OF THE INVENTION

According to one aspect of the present invention, there is provided a control system including a charging station, a plurality of autonomous work machines, and a control apparatus configured to control the plurality of autonomous work machines, wherein the control apparatus comprises: an obtaining unit configured to obtain power information of each autonomous work machine; and a control unit configured to control each autonomous work machine based on the power information such that charging timings of the autonomous work machines at the charging station do not match each other.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, the embodiments of the present invention will be described with reference to the accompanying drawings. It should be noted that the same reference numerals denote the same constituent elements throughout the drawings.

First Embodiment

Figure 1:
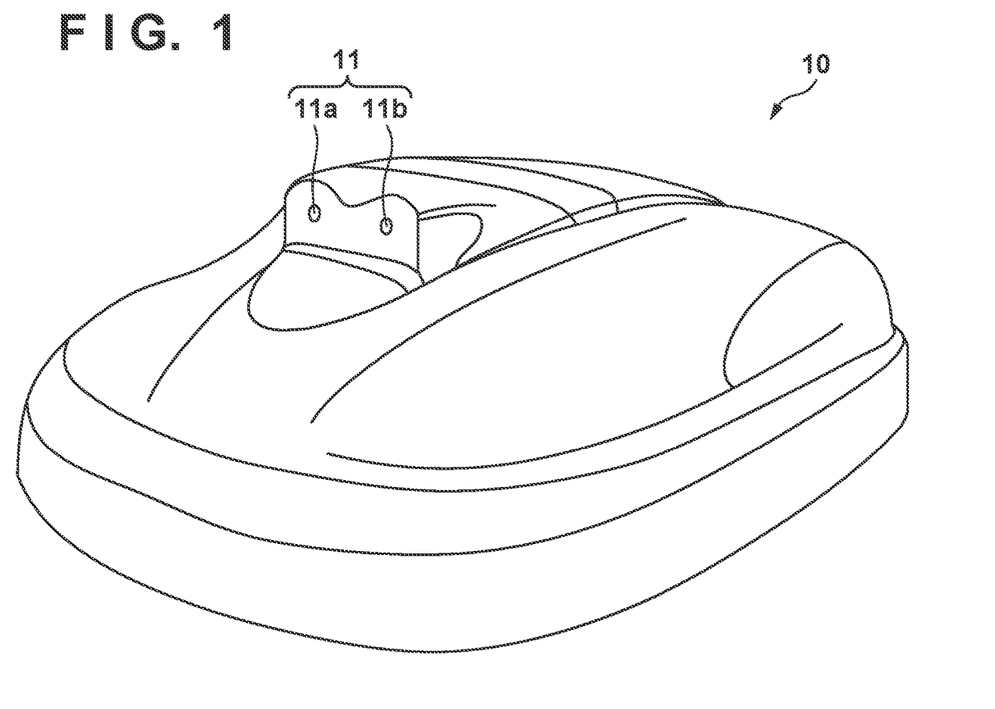
FIG. 1 is a view showing the outer appearance of a work machine capable of autonomous traveling according to an embodiment of the present invention.

FIG. 1 is a view showing the outer appearance of an autonomous work machine capable of autonomous traveling according to an embodiment of the present invention. In the following description, the traveling direction (vehicle longitudinal direction) of the autonomous work machine in a side view, a lateral direction (vehicle width direction) perpendicular to the traveling direction, and a perpendicular direction perpendicular to the traveling direction and the lateral direction are respectively defined as a front-and-rear direction, a left-and-right direction, and a vertical direction, and the arrangement of each component will be explained in accordance with these directions.

In FIG. 1, reference numeral 10 denotes an autonomous work machine (to be referred to as "a work vehicle" hereinafter). More specifically, the work vehicle 10 functions as an autonomous traveling lawn mower. However, the lawn mower is merely an example, and the present invention is also applicable to other types of work machines. The work vehicle 10 has a camera unit 11 including a plurality of cameras (a first camera 11a and a second camera 11b), and can calculate and obtain information of the distance between the work vehicle 10 and an object existing in front of the work vehicle 10 by using images captured by the first and second cameras 11a and 11b having a parallax. The operation of the work vehicle 10 is controlled based on the captured image and an object recognition model held in advance.

Figure 2:
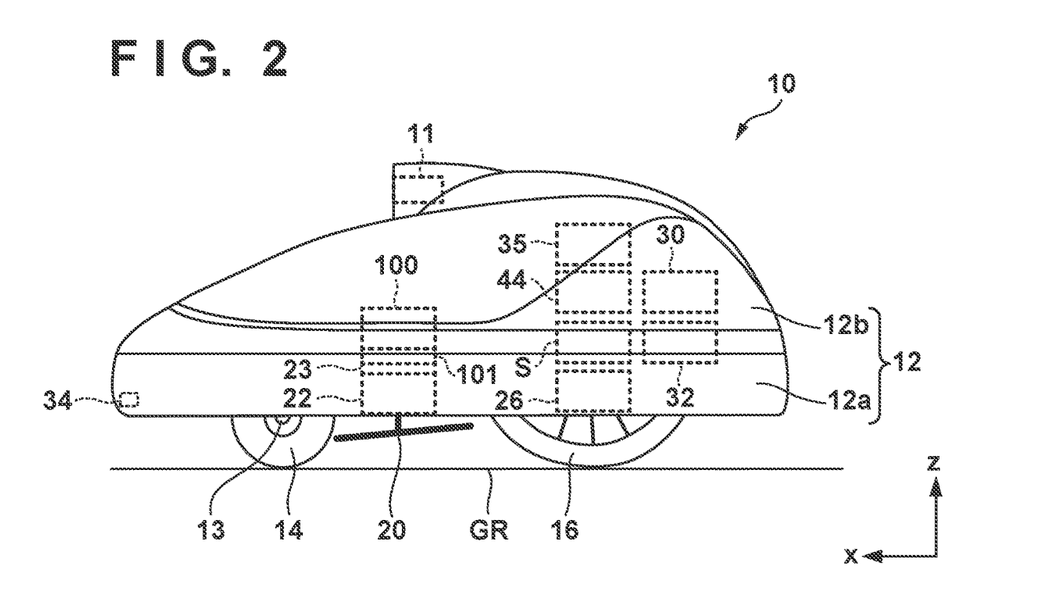
FIG. 2 is a view observing the work machine according to the embodiment of the present invention sideways.

FIG. 2 is a view observing the work vehicle 10 in the lateral direction (vehicle width direction). As shown in FIG. 2, the work vehicle 10 includes the camera unit 11, a vehicle body 12, a stay 13, front wheels 14, rear wheels 16, a blade 20, a work motor 22, a motor holding member 23, a blade height adjusting motor 100, and a translation mechanism 101. The work vehicle 10 also includes traveling motors 26, various sensors S, an ECU (Electronic Control Unit) 44, a charging unit 30, a battery 32, a charging terminal 34, and a communication unit 35.

The vehicle body 12 of the work vehicle 10 includes a chassis 12a and a frame 12b attached to the chassis 12a. The front wheels 14 are two, left and right small-diameter wheels fixed to the front part of the chassis 12a via the stay 13. The rear wheels 16 are two, left and right large-diameter wheels attached to the rear part of the chassis 12a.

The blade 20 is a lawn mowing rotary blade attached near the central position of the chassis 12a. The work motor 22 is an electric motor arranged above the blade 20. The blade 20 is connected to and rotated by the work motor 22. The motor holding member 23 holds the work motor 22. The rotation of the motor holding member 23 is regulated with respect to the chassis 12a. In addition, the vertical movement of the motor holding member 23 is permitted by a combination of a guide rail and a slider capable of vertically moving by being guided by the guide rail.

The blade height adjusting motor 100 is a motor for adjusting the height of the blade 20 in the vertical direction from a ground surface GR. The translation mechanism 101 is connected to the blade height adjusting motor 100, and converts the rotation of the blade height adjusting motor 100 into a vertical translational movement. The translation mechanism 101 is also connected to the motor holding member 23 for holding the work motor 22.

The rotation of the blade height adjusting motor 100 is converted into the translational movement (vertical movement) by the translation mechanism 101, and this translational movement is transmitted to the motor holding member 23. The translational movement (vertical movement) of the motor holding member 23 causes the work motor 22 held by the motor holding member 23 to translationally move (vertically move). The height of the blade 20 from the ground surface GR can be adjusted by the vertical movement of the work motor 22.

The traveling motors 26 are two electric motors (motors) attached to the chassis 12a of the work vehicle 10. The two electric motors are connected to the left and right rear wheels 16. The left and right wheels are independently rotated forward (rotated in an advancing direction) or rotated backward (rotated in a retreating direction) by using the front wheels 14 as driven wheels and the rear wheels 16 as driving wheels. This allows the work vehicle 10 to move in various directions.

The charging terminal 34 is a charging terminal installed in the front end position of the frame 12b in the front-and-rear direction. The charging terminal 34 can receive power from a charging station (a charging station 300 to be described later with reference to FIG. 3) when connected to a corresponding terminal of the charging station. The charging terminal 34 is connected to the charging unit 30 by a line, and the charging unit 30 is connected to the battery 32. The work motor 22, the traveling motors 26, and the blade height adjusting motor 100 are also connected to the battery 32, and receive power from the battery 32.

The ECU 44 is an electronic control unit including a microcomputer formed on a circuit board, and controls the operation of the work vehicle 10. Details of the ECU 44 will be described later. The communication unit 35 can transmit/receive information to/from an external device (for example, another work vehicle, a control apparatus, a charging station, or the like to be described later) connected to the work vehicle 10 by a wire or wirelessly.

Figure 3:
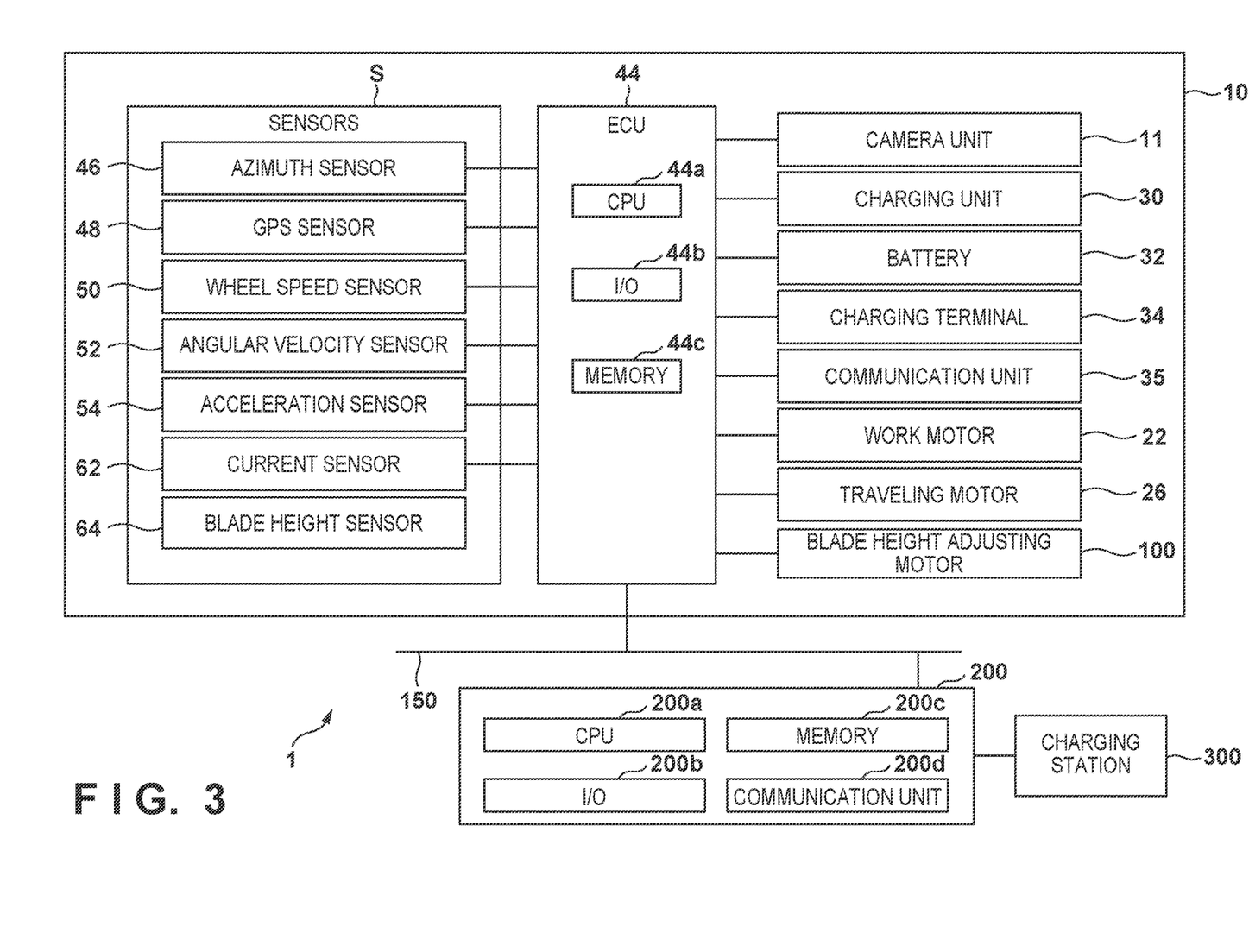
FIG. 3 is a block diagram showing an example of the arrangement of a control system according to the embodiment of the present invention.

FIG. 3 is a block diagram showing an example of the arrangement of a control system according to the embodiment of the present invention. A control system 1 is configured to include a plurality of work vehicles (one work vehicle 10 is shown in FIG. 3), a control apparatus (server) 200, and the charging station 300. Other work vehicles have the same arrangement as the work vehicle 10.

As shown in FIG. 3, the ECU 44 provided in the work vehicle 10 includes a CPU 44a, an I/O 44b, and a memory 44c. The I/O 44b inputs/outputs various kinds of information. The memory 44c is, for example, a ROM (Read Only Memory), an EEPROM (Electrically Erasable Programmable Read Only Memory), or a RAM (Random Access Memory). The memory 44c stores the work schedule of the work vehicle 10, information on the work area, and various programs for controlling the operation of the work vehicle 10. The ECU 44 can operate as each processing unit for implementing the present invention by reading out and executing a program stored in the memory 44c.

The ECU 44 is connected to the various sensors S. The sensors S include an azimuth sensor 46, a GPS sensor 48, a wheel speed sensor 50, an angular velocity sensor 52, an acceleration sensor 54, a current sensor 62, and a blade height sensor 64.

The azimuth sensor 46 and the GPS sensor 48 are sensors for obtaining information of the direction and the position of the work vehicle 10. The azimuth sensor 46 detects the azimuth corresponding to the terrestrial magnetism. The GPS sensor 48 receives radio waves from GPS satellites and detects information indicating the current position (the latitude and the longitude) of the work vehicle 10.

The wheel speed sensor 50, the angular velocity sensor 52, and the acceleration sensor 54 are sensors for obtaining information on the moving state of the work vehicle 10. The wheel speed sensor 50 detects the wheel speeds of the left and right wheels 16. The angular velocity sensor 52 detects the angular velocity around the vertical axis (the z-axis in the perpendicular direction) in the barycentric position of the work vehicle 10. The acceleration sensor 54 detects accelerations in the directions of three perpendicular axes, that is, the x-, y-, and z-axes, which act on the work vehicle 10.

The current sensor 62 detects the current consumption (power consumption) of the battery 32. The detection result of the current consumption (power consumption) is saved in the memory 44c of the ECU 44. When a predetermined power amount is consumed, and the power amount stored in the battery 32 becomes equal to or lower than a threshold value, the ECU 44 performs return control for returning the work vehicle 10 to the charging station 300 in order to charge the work vehicle 10.

The blade height sensor 64 detects the height of the blade 20 from the ground surface GR. The blade height sensor 64 outputs the detection result to the ECU 44. Under the control of the ECU 44, the blade height adjusting motor 100 is driven, and the blade 20 vertically moves, thereby adjusting the height from the ground surface GR.

The outputs from the various sensors S are input to the ECU 44 via the I/O 44b. Based on the outputs from the various sensors S, the ECU 44 supplies power from the battery 32 to the traveling motor 26, the work motor 22, and the height adjusting motor 100. The ECU 44 controls the traveling motor 26 by outputting a control value via the I/O 44b, thereby controlling traveling of the work vehicle 10. The ECU 44 also controls the height adjusting motor 100 by outputting a control value via the I/O 44b, thereby controlling the height of the blade 20. Furthermore, the ECU 44 controls the work motor 22 by outputting a control value via the I/O 44*b*, thereby controlling the rotation of the blade 20. The I/O 44*b* can function as a communication interface, and can be connected to the control apparatus 200 or another apparatus via a network 150 by a wire or wirelessly.

The control apparatus 200 functions as a server configured to control each work vehicle. The control apparatus 200 includes a CPU 200*a*, an I/O 200*b*, a memory 200*c*, and a communication unit 200*d*. The memory 200*c* is a ROM (Read Only Memory), an EEPROM (Electrically Erasable Programmable Read Only Memory), a RAM (Random Access Memory), or the like. The I/O 200*b* inputs/outputs various kinds of information. The memory 200*c* stores the work schedule of each work vehicle, information on the work area, power information such as the remaining battery amount of each work vehicle, and various programs for controlling the operation of each work vehicle. Also, the memory 200*c* may store the information of a work load in each work area. For example, since power consumption is large in a work area with a large work load (a place with a large height difference, a place where grasses have grown, or the like), large power consumption is stored in association with such a work area. The CPU 200*a* reads out a program stored in the memory 200*c* and executes it, thereby operating as processing units for implementing the present invention. The communication unit 200*d* communicates with an apparatus (for example, the work vehicle 10 or the charging station 300) existing outside the control apparatus 200 and transmits/receives various kinds of information.

The charging station 300 functions as a charging apparatus configured to charge the battery (battery 32) of the work vehicle 10. The charging station 300 is installed in a work area, and the work vehicle 10 can perform charging by returning to the charging station 300 and connecting the charging terminal 34 to the charging station 300. Note that the charging station 300 can charge only one work vehicle at once.

<Processing>

Figure 4:
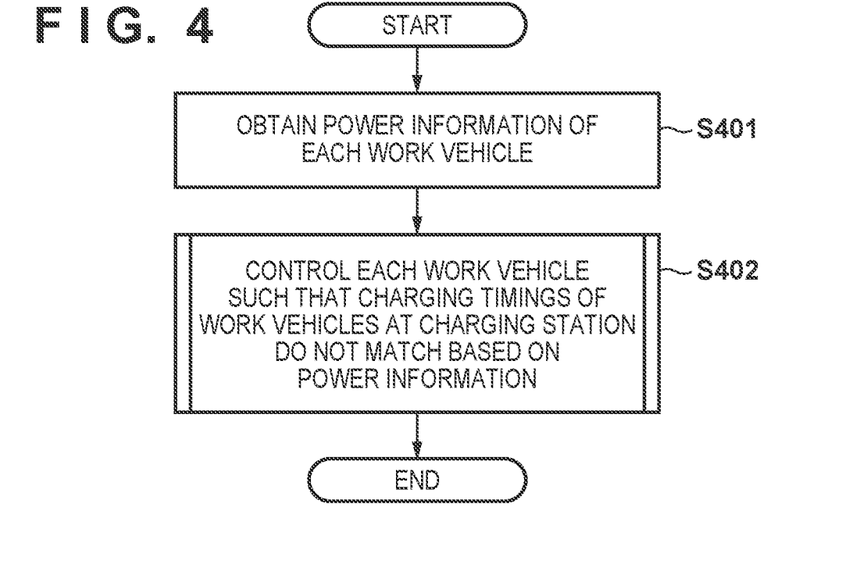
FIG. 4 is a flowchart showing a processing procedure executed by a control apparatus according to the embodiment of the present invention.
Figure 7:
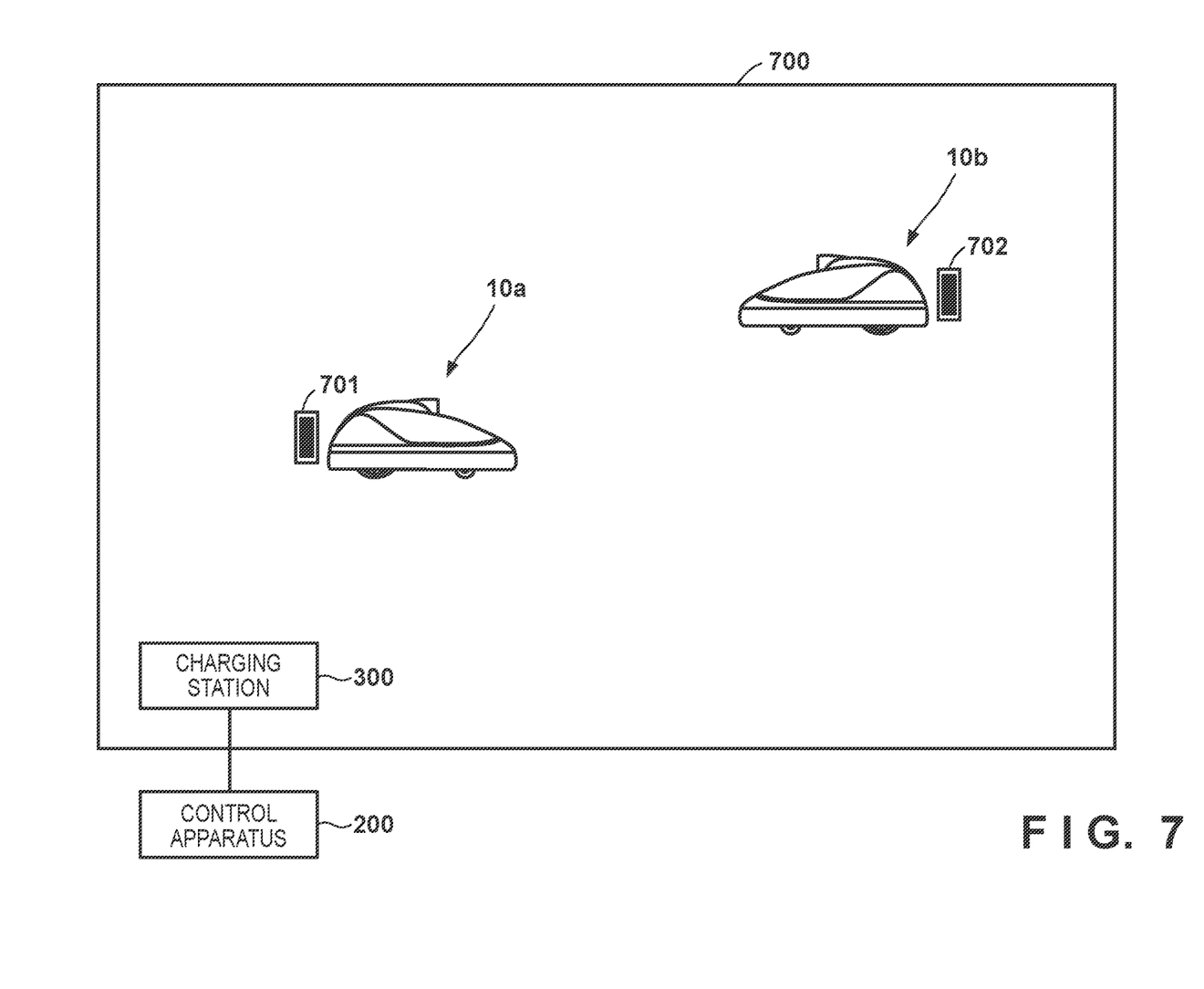
FIG. 7 is an explanatory view of control according to the embodiment of the present invention.

The procedure of processing executed by the control apparatus 200 of the control system 1 according to this embodiment will be described next with reference to the flowchart of FIG. 4. In step S401, the CPU 200*a* controls the communication unit 200*d* to communicate with each work vehicle, thereby obtaining power information of each work vehicle. The power information is, for example, the information of the remaining battery amount of each work vehicle. FIG. 7 is a schematic view showing work vehicles 10*a* and 10*b* in a work area 700, battery information 701 of the work vehicle 10*a*, and battery information 702 of the work vehicle 10*b*. The work vehicle 10*a* and the work vehicle 10*b* have the same arrangement as the work vehicle 10 described with reference to FIG. 3. The work area 700 is, for example, an area where a lawn mowing work is executed on a lawn. Each of the work vehicles 10*a* and 10*b* performs the work while autonomously traveling in the work area 700. The control apparatus 200 wirelessly communicates with each of the work vehicles 10*a* and 10*b* and obtains the information of the remaining battery amount of each of the work vehicles 10*a* and 10*b*. Note that in the example shown in FIG. 7, two work vehicles are illustrated. However, three or more work vehicles may exist.

In step S402, the CPU 200*a* controls each work vehicle based on the power information obtained in step S401 such that the charging timings of the work vehicles at the charging station 300 do not match. Details of this processing will be described later. The series of processes shown in FIG. 4 thus ends.

Figure 5:
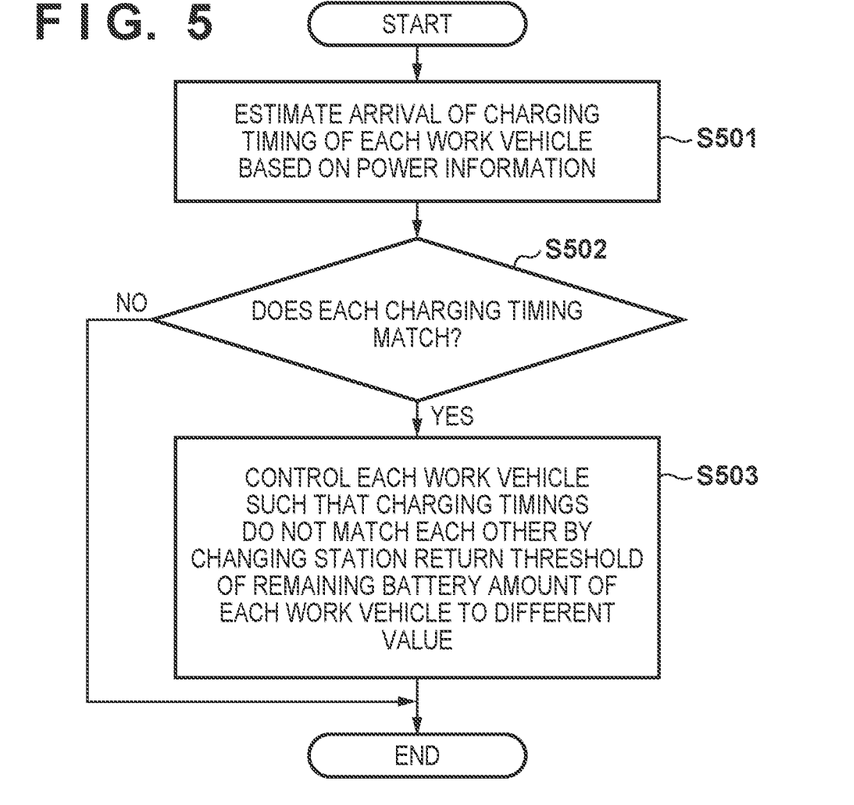
FIG. 5 is a flowchart showing a detailed procedure of control processing according to the first embodiment.

Details of the processing of step S402 in FIG. 4 according to this embodiment will be described next with reference to the flowchart of FIG. 5. In step S501, the CPU 200*a* estimates the arrival of the charging timing of each work vehicle based on the power information obtained in step S401. For example, it is estimated that the charging timing of the work vehicle 10*a* arrives at 14:00, and the charging timing of the work vehicle 10*b* arrives at 14:30. Note that each of the work vehicles 10*a* and 10*b* is configured to determine whether the remaining battery amount of the self-vehicle is equal to or smaller than a threshold, and upon determining that the remaining battery amount is equal to or smaller than the threshold, determine that the charging timing at the charging station 300 has arrived. Each work vehicle is configured to control the self-vehicle to return to the charging station 300 upon determining that the charging timing has arrived.

In step S502, the CPU 200*a* determines whether the estimated charging timings of the work vehicles match. Here, a state in which the charging timings match includes, for example, a state in which another work vehicle is charging at the charging station 300, and a charging wait state occurs until the charging ends, in addition to a state in which a plurality of work vehicles simultaneously return to the charging station 300. A predetermined time is needed after a work vehicle starts charging until the charging is completed, and the work vehicle leaves the charging station 300. For example, in a case in which 1 hr is needed until full charge, and it is estimated that the charging timing of the work vehicle 10*a* arrives at 14:00, and the charging timing of the work vehicle 10*b* arrives at 14:30, if the work vehicle 10*a* starts charging at 14:00, charging continues until 15:00. Hence, the work vehicle 10*b* cannot perform charging at the charging station 300 from 14:30 to 15:00, and a charging wait state occurs. Even in this case, it can be determined that the charging timings match. Hence, if the remaining battery amount difference falls within a predetermined range, it can be determined that the charging timings match. If the remaining battery amount difference is zero, the work vehicles return to the charging station 300 at the same charging timing.

If it is determined that the charging timings of the work vehicles match, the process advances to step S503. On the other hand, if it is determined that the charging timings of the work vehicles do not match, the processing is ended. Note that in the example shown in FIG. 7, the remaining battery amount 701 of the work vehicle 10*a* is 100%, and the remaining battery amount 702 of the work vehicle 10*b* is 100%, too. Since the charge amount of the work vehicle 10*a* and that of the work vehicle 10*b* simultaneously decrease, the charging timings match.

In step S503, the CPU 200*a* changes the threshold set for the work vehicles to a value different for each work vehicle, thereby controlling each work vehicle such that the charging timings do not match each other. For example, the threshold of the remaining battery amount for the work vehicle 10*a* may be changed from an initial value of 20% to 50%, and the threshold of the remaining battery amount for the work vehicle 10*b* may be changed from an initial value of 20% to 10%. This can advance the arrival of the charging timing of the work vehicle 10*a* and also delay the arrival of the charging timing of the work vehicle 10*b*, and matching of the charging timings can be avoided.

As described above, in this embodiment, power information is obtained from each work vehicle, and control is performed based on the obtained power information such that the charging timings of the work vehicles at the charging station do not match. This makes it possible to avoid occurrence of a charging wait state of a work vehicle and improve work efficiency.

Second Embodiment

In the first embodiment, an example has been described in which the threshold set for the work vehicles and used to return to the charging station is changed to a value different for each work vehicle, thereby performing control such that the charging timings do not match each other. In the second embodiment, an example in which the power consumption of each work vehicle is changed, thereby performing control such that the charging timings do not match each other will be described.

Note that the arrangement of a control system according to this embodiment is the same as the arrangement of the control system 1 described in the first embodiment, and a description thereof will be omitted. Processing according to this embodiment is different from the first embodiment in details of the processing of step S402 in FIG. 4. Details of the processing of step S402 in FIG. 4 according to this embodiment will be described below with reference to the flowchart of FIG. 6. The processes of steps S601 and S602 are the same as steps S501 and S502 in FIG. 5, respectively, and a description thereof will be omitted.

Figure 6:
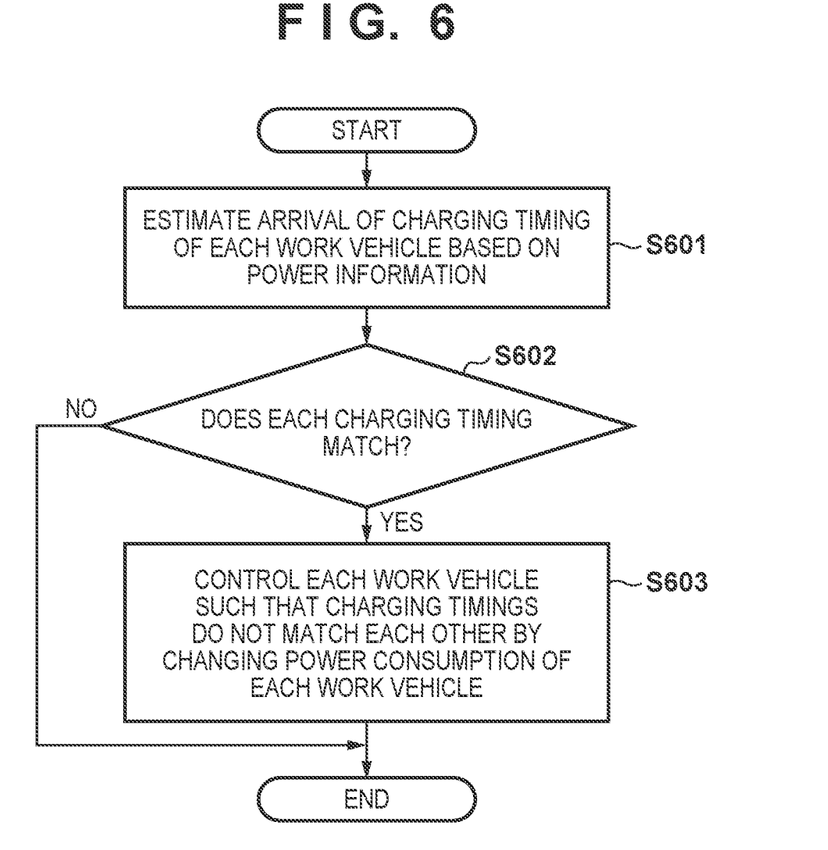
FIG. 6 is a flowchart showing a detailed procedure of control processing according to the second embodiment.

In step S603, a CPU 200a controls a communication unit 200d to communicate with each work vehicle and change the power consumption of each work vehicle, thereby controlling each work vehicle such that charging timings do not match each other. When the power consumption is changed, the decrease speed of the remaining battery amount of each work vehicle changes, and therefore, matching of the charging timings can be avoided.

For example, the CPU 200a can control traveling motors 26 of each work vehicle to change the traveling speed, thereby changing the power consumption of each work vehicle. When the traveling speed is increased, power consumption increases. Hence, the decrease of the remaining battery amount can be accelerated. On the other hand, when the traveling speed is reduced, power consumption decreases. Hence, the decrease of the remaining battery amount can be decelerated. As an example, the traveling speed of each work vehicle may be changed by selectively setting the traveling speed from three patterns: 0.55 m/s, 0.45 m/s, and 0.35 m/s.

Also, the CPU 200a can control a blade height adjusting motor 100 of each work vehicle to change the height of a blade 20 provided in each work vehicle, thereby changing the power consumption of each work vehicle. When the height of the blade 20 is reduced, the blade 20 readily contacts the lawn and grasses. Since the load increases, the power consumption increases. Hence, the decrease of the remaining battery amount can be accelerated. On the other hand, when the height of the blade 20 is increased, the blade 20 hardly contacts the lawn and grasses. Since the load decreases, the power consumption decreases. Hence, the decrease of the remaining battery amount can be decelerated. As an example, the blade height of each work vehicle may be changed by selectively setting the blade height from three patterns: 8 cm, 7 cm, and 6 cm.

Alternatively, the CPU 200a can control a work motor 22 provided in each work vehicle to change the rotation speed of the blade 20 provided in each work vehicle, thereby changing the power consumption of each work vehicle. When the rotation speed of the blade 20 is increased, the power consumption increases. Hence, the decrease of the remaining battery amount can be accelerated. On the other hand, when the rotation speed of the blade 20 is reduced, the power consumption decreases. Hence, the decrease of the remaining battery amount can be decelerated.

The processing shown in FIG. 6 thus ends.

As described above, in this embodiment, the power consumption of each work vehicle is changed, thereby performing control such that the charging timings do not match each other. This makes it possible to avoid occurrence of a charging wait state of a work vehicle and improve work efficiency.

Figure 8:
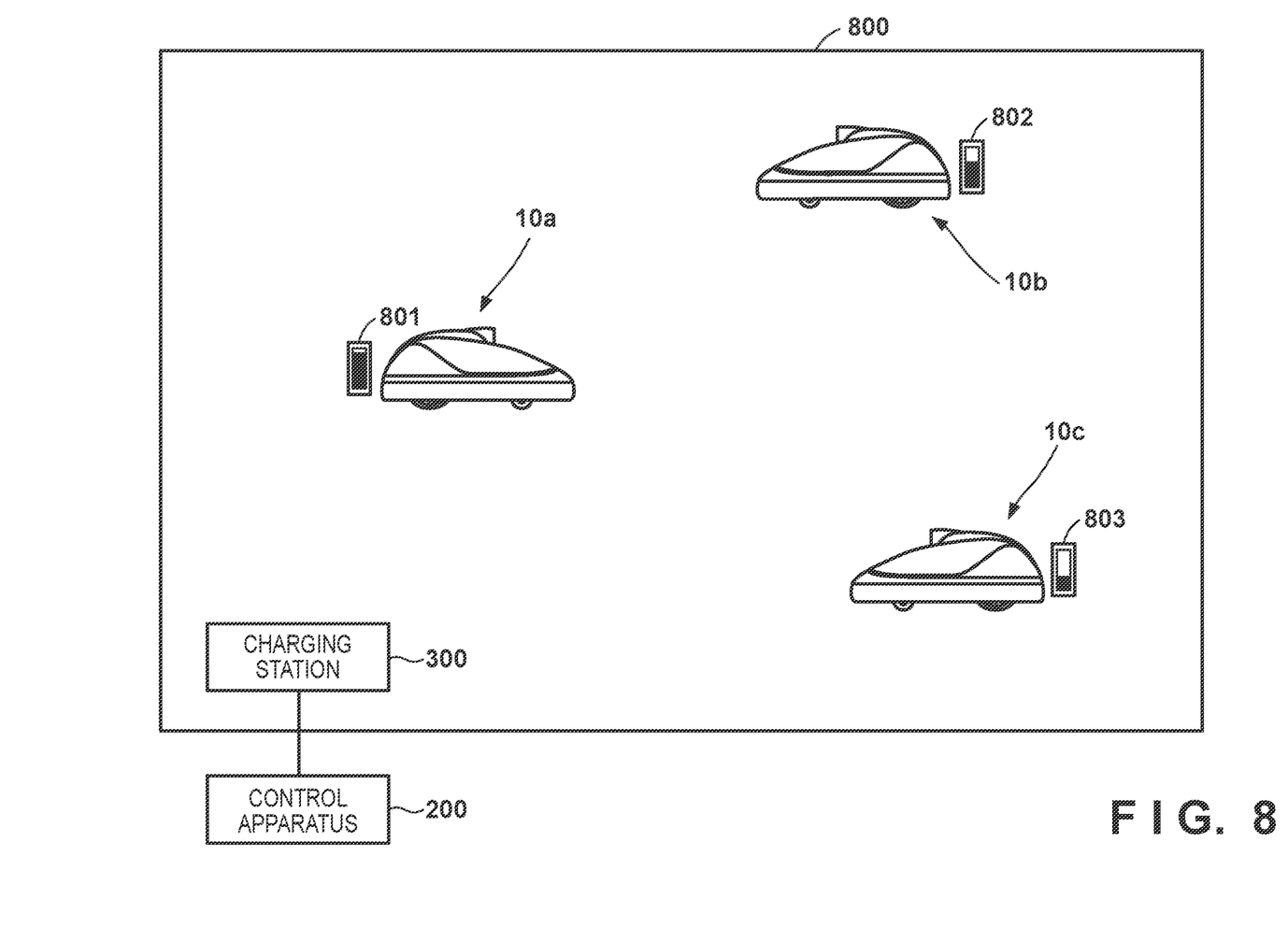
FIG. 8 is an explanatory view of control according to the embodiment of the present invention.

Note that in step S603, the CPU 200a may change the power consumption of each work vehicle such that the remaining battery amounts of the work vehicles have an equal interval. FIG. 8 is a schematic view showing work vehicles 10a, 10b, and 10c in a work area 800, battery information 801 of the work vehicle 10a, battery information 802 of the work vehicle 10b, and battery information 803 of the work vehicle 10c. The work vehicle 10a, the work vehicle 10b, and the work vehicle 10c have the same arrangement as the work vehicle 10 described with reference to FIG. 3. The work area 800 is, for example, an area where a lawn mowing work is executed on a lawn. Each of the work vehicles 10a, 10b, and 10c performs the work while autonomously traveling in the work area 800.

For example, as shown in FIG. 8, the power consumption of each work vehicle may be changed such that the ratio of the remaining battery amount 801 of the work vehicle 10a becomes 90% of full charge, the ratio of the remaining battery amount 802 of the work vehicle 10b becomes 60% of full charge, and the ratio of the remaining battery amount 803 of the work vehicle 10c becomes 30% of full charge, that is, the ratios of the remaining battery amounts have an equal interval of 30%.

For example, consider a case in which before execution of control processing according to the present invention, the remaining battery amount of the work vehicle 10a is 95%, the remaining battery amount of the work vehicle 10b is 92%, and the remaining battery amount of the work vehicle 10c is 90%, and if the power consumption is not changed, it is determined that the charging timings of the three work vehicles match. In this case, for example, the CPU 200a reduces the power consumption of the work vehicle 10a, increases the power consumption of the work vehicle 10b, and makes the power consumption of the work vehicle 10c larger than that of the work vehicle 10b, thereby controlling such that the ratios of the remaining battery amounts of the work vehicles become 90%, 60%, and 30% at an equal interval. Note that the interval is not limited to 30%, and another interval (20%, 40%, or the like) may be set if matching of the charging timings can be avoided. Also, not an equal interval but different intervals may be set such that the interval between the work vehicle 10a and the work vehicle 10b becomes 30%, and the interval between the work vehicle 10b and the work vehicle 10c becomes 35%.

Also, in step S603, the CPU 200a can change a work area assigned to each work vehicle to a work area different for each work vehicle, thereby changing the power consumption of each work vehicle. For example, a large work area is assigned to a work vehicle whose power consumption should be increased, and a small work area is assigned to a work vehicle whose power consumption should be reduced.

For a work vehicle assigned a work area with a large area, since the distance to travel straight becomes long, and occurrence of deceleration control or a turn operation on the periphery of the work area decreases, time loss caused by the deceleration or turn operation decreases. Hence, the work amount (for example, the amount of lawn or grasses that can be mown) per unit time increases, and the load thus increases. As a result, the power consumption increases.

On the other hand, for a work vehicle assigned a work area with a small area, since the distance to travel straight becomes short, and deceleration control or a turn operation on the periphery of the work area frequently occurs, time loss caused by the deceleration or turn operation increases. During traveling at a low speed or during a turn operation, the work load of the blade 20 on the lawn or grasses is small. That is, the lawn or grasses are not mown even if the blade 20 is rotated. Hence, the work amount (for example, the amount of lawn or grasses that can be mown) per unit time decreases, and the load thus decreases. As a result, the power consumption decreases.

Figure 9:
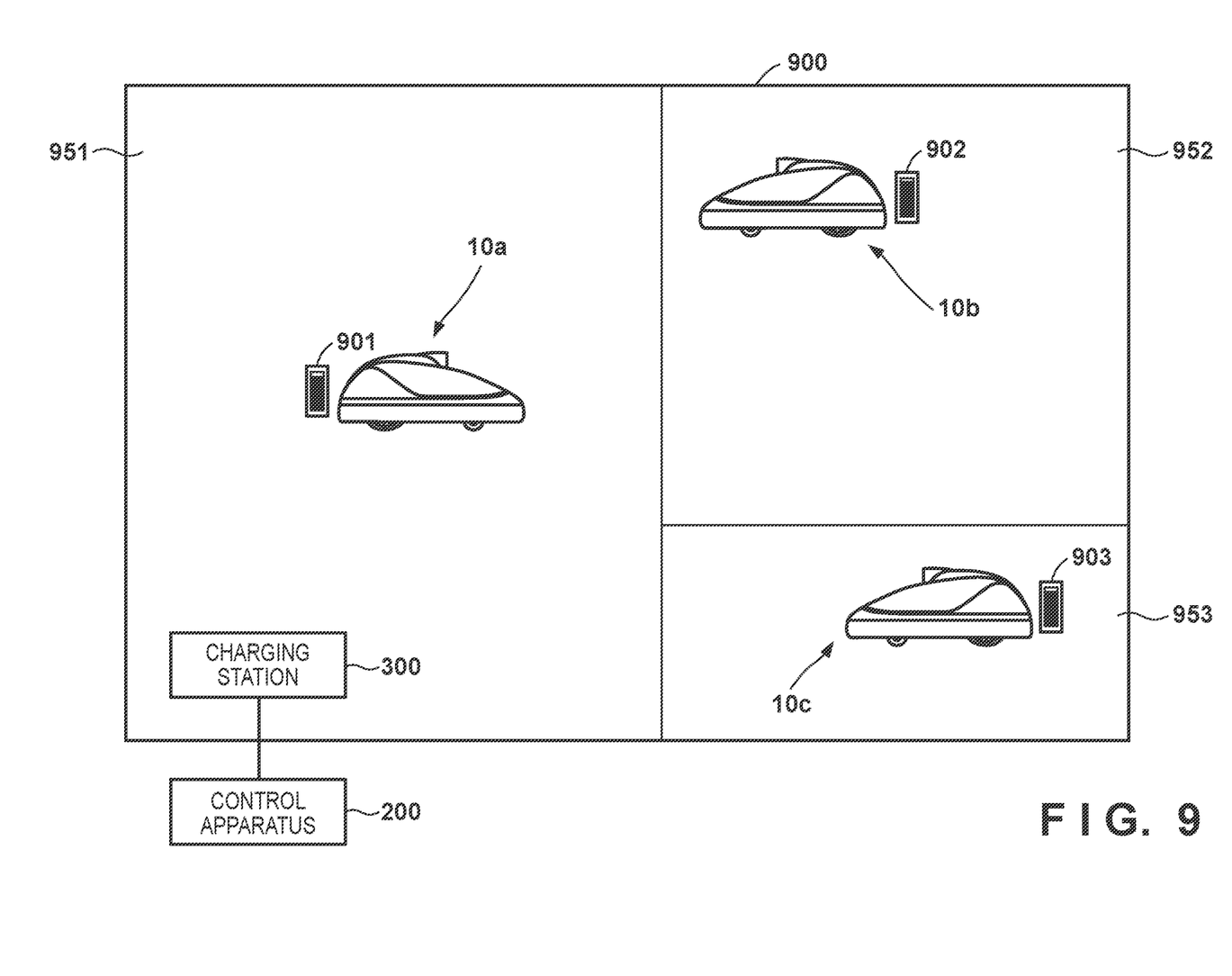
FIG. 9 is an explanatory view of control according to the embodiment of the present invention.

FIG. 9 is a schematic view showing the work vehicles 10a, 10b, and 10c in a work area 900, battery information 901 of the work vehicle 10a, battery information 902 of the work vehicle 10b, and battery information 903 of the work vehicle 10c. The work area 900 is, for example, an area where a lawn mowing work is executed on a lawn. For example, a work area 951 is assigned to the work vehicle 10a, a work area 952 is assigned to the work vehicle 10b, and a work area 953 is assigned to the work vehicle 10c. The remaining battery amounts of the work vehicles are initially almost equal. If it is determined that the charging timings match, work areas of different areas are assigned to the work vehicles, thereby changing the power consumption between the work vehicles. It is therefore possible to avoid matching of the charging timings.

The CPU 200a may change the work area assigned to each work vehicle based on the information of the work load of each work area stored in a memory 200c in advance, thereby changing the power consumption of each work vehicle. For example, using the fact that the power consumption is large in a work area with a large work load (a place with a large height difference, a place where grasses have grown, or the like), a work vehicle whose work load should be increased is assigned to a work area with a large work load, thereby adjusting the power consumption.

[Modifications]

In the above-described embodiments, the description has been made assuming that the control apparatus 200 executes the processing according to the present invention. For example, the function of the control apparatus 200 may be imparted to the charging station 300, and the charging station 300 may execute the processing according to the present invention. Since matching of the charging timings can be avoided without providing the control apparatus 200, the product cost can be reduced.

Also, in the above-described embodiments, the description has been made assuming that the control apparatus 200 executes the processing according to the present invention. However, the function of the control apparatus 200 may be imparted to any one of the work vehicles, and the work vehicle may execute the processing according to the present invention. In this case, the ECU 44 communicates with another work vehicle using the communication unit 35 and obtains the power information of the other work vehicle. Based on the power information of the self-vehicle and the obtained power information of the other work vehicle, the self-vehicle and the other work vehicle are controlled such that the charging timings of the work vehicles at the charging station 300 do not match. Since matching of the charging timings can be avoided without providing the control apparatus 200, the product cost can be reduced.

Also, in the above-described embodiments, the description has been made using the combination of a plurality of work vehicles and one charging station as an example. However, the present invention can also be applied to a combination of a plurality of work vehicles and a plurality of charging stations. In the above-described embodiments, the description has been made using an example in which the number of work vehicles is two or three. However, the present invention can also be applied to a case in which four or more work vehicles exist.

Also, in the above-described embodiments, the description has been made using a lawn mower as an example of the autonomous work machine. However, the autonomous work machine is not limited to a lawn mower. For example, the present invention can also be applied to an autonomous work machine of another type such as an autonomous snow remover or a golf ball retriever. In the above-described embodiments, an example in which the work machine is autonomously controlled based on images obtained from a plurality of cameras has been described. However, the work machine to which the present invention is applicable is not limited to a work machine that uses camera images. For example, the present invention can also be applied to a work machine that performs autonomous control using an obstacle sensor (distance measuring sensor) such as an ultrasonic sensor or an infrared sensor.

The present invention is not limited to the above embodiments and various changes and modifications can be made within the spirit and scope of the present invention. Therefore, to apprise the public of the scope of the present invention, the following claims are made.

Summary of Embodiments

1. A control system (for example, 1) according to the above-described embodiment is
a control system (for example, 1) including a charging station (for example, 300), a plurality of autonomous work machines (for example, 10a, 10b, 10c), and a control apparatus (for example, 200) configured to control the plurality of autonomous work machines, wherein
the control apparatus (for example, 200) comprises:
an obtaining unit (for example, 200a) configured to obtain power information of each autonomous work machine (for example, 10a, 10b, 10c); and
a control unit (for example, 200a) configured to control each autonomous work machine based on the power information such that charging timings of the autonomous work machines at the charging station (for example, 300) do not match each other.

According to this embodiment, it is possible to avoid occurrence of a charging wait state of the autonomous work machine and improve work efficiency.

2. In the control system (for example, 1) according to above-described embodiment,
each autonomous work machine (for example, 10a, 10b, 10c) comprises:
a determination unit (for example, 44) configured to determine whether a remaining battery amount is not more than a threshold;
a timing determination unit (for example, 44) configured to, if it is determined that the remaining battery amount is not more than the threshold, determine that the charging timing at the charging station has arrived; and a return control unit (for example, 44) configured to, if it is determined that the charging timing has arrived, control the autonomous work machine to return to the charging station, the control apparatus (for example, 200) further comprises an estimation unit (for example, 200a) configured to estimate the arrival of the charging timing of each autonomous work machine based on the power information, and if the estimated charging timings match, the control unit (for example, 200a) changes the threshold to a value different for each autonomous work machine, thereby controlling each autonomous work machine such that the charging timings do not match each other.

According to this embodiment, matching of the charging timings can easily be prevented.

3. In the control system (for example, 1) according to above-described embodiment, the control apparatus (for example, 200) further comprises an estimation unit (for example, 200a) configured to estimate the arrival of the charging timing of each autonomous work machine based on the power information, and if the estimated charging timings match, the control unit (for example, 200a) changes power consumption of each autonomous work machine, thereby controlling each autonomous work machine such that the charging timings do not match each other.

According to this embodiment, matching of the charging timings can easily be prevented.

4. In the control system (for example, 1) according to above-described embodiment, the control unit (for example, 200a) changes the power consumption of each autonomous work machine (for example, 10a, 10b, 10c) by changing a traveling speed of each autonomous work machine.

According to this embodiment, matching of the charging timings can be prevented by easy control of increasing the traveling speed of an autonomous work machine whose power consumption should be increased and decreasing the traveling speed of an autonomous work machine whose power consumption should be reduced.

5. In the control system (for example, 1) according to above-described embodiment, each autonomous work machine (for example, 10a, 10b, 10c) comprises a blade (for example, 20) for a work, and the control unit (for example, 200a) changes the power consumption of each autonomous work machine by changing a height of the blade for each autonomous work machine.

According to this embodiment, when the height of the blade for a work (for example, a blade for lawn mowing) is reduced, the contact between the blade and the lawn is increased, and the load is increased, thereby accelerating the decrease of the remaining battery amount. On the other hand, when the height of the blade is increased, the contact between the blade and the lawn is reduced, and the load is reduced, thereby decelerating the decrease of the remaining battery amount. This can easily prevent matching of the charging timings.

6. In the control system (for example, 1) according to above-described embodiment, each autonomous work machine (for example, 10a, 10b, 10c) comprises a blade (for example, 20) for a work, and the control unit (for example, 200a) changes the power consumption of each autonomous work machine by changing a rotation speed of the blade for each autonomous work machine.

According to this embodiment, when the rotation speed of the blade for a work (for example, a blade for lawn mowing) is increased, the decrease of the remaining battery amount can be accelerated. On the other hand, when the rotation speed of the blade is reduced, the decrease of the remaining battery amount can be decelerated. This can easily prevent matching of the charging timings.

7. In the control system (for example, 1) according to above-described embodiment, the control unit (for example, 200a) changes the power consumption of each autonomous work machine such that the remaining battery amounts of the autonomous work machines have an equal interval.

According to this embodiment, when the remaining battery amounts are caused to have differences at an equal interval, the charging timings can have sufficient differences. This can prevent matching of the charging timings.

8. In the control system (for example, 1) according to above-described embodiment, the control unit (for example, 200a) changes the power consumption of each autonomous work machine by changing a work area assigned to each autonomous work machine to an area different for each autonomous work machine.

According to this embodiment, if the work area is large, since the distance to travel straight becomes long, and occurrence of deceleration control or a turn operation decreases, the work amount per unit time increases, the load increases, and the power consumption thus increases. Conversely, if the work area is small, during traveling at a low speed or during a turn operation, idle rotation of the blade occurs. Hence, the work amount per unit time decreases, the load decreases, and the power consumption thus decreases. This can prevent matching of the charging timings.

9. In the control system (for example, 1) according to above-described embodiment, the control apparatus (for example, 200) further comprises a storage unit (for example, 200c) configured to store information of a work load of each work area, and the control unit (for example, 200a) changes the power consumption of each autonomous work machine by changing the work area assigned to each autonomous work machine in accordance with the work load.

According to this embodiment, the power consumption can be adjusted using the fact that the power consumption is large in an area with a large work load (a place with a large height difference, a place where grasses have grown, or the like).

10. A control apparatus (for example, 200) according to the above-described embodiment is a control apparatus for controlling a plurality of autonomous work machines, comprising:

an obtaining unit configured to obtain power information of each autonomous work machine; and a control unit configured to control each autonomous work machine based on the power information such that charging timings of the autonomous work machines at a charging station do not match each other.

According to this embodiment, by the control apparatus functioning as a server, it is possible to avoid occurrence of a charging wait state of the autonomous work machine and improve work efficiency.

11. An autonomous work machine (for example, 10a, 10b, 10c) according to the above-described embodiment is
an autonomous work machine capable of communicating with another autonomous work machine, comprising:
an obtaining unit (for example, 44) configured to obtain power information of the autonomous work machine and power information of the other autonomous work machine; and
a control unit (for example, 44) configured to control the autonomous work machine and the other autonomous work machine based on the power information of the autonomous work machine and the power information of the other autonomous work machine such that charging timings of the autonomous work machines at a charging station do not match each other.

According to this embodiment, the autonomous work machine itself communicates with the other autonomous work machine, thereby avoiding occurrence of a charging wait state of the autonomous work machine and improving work efficiency. Hence, another apparatus such as a server is unnecessary.

12. An operation method a control apparatus (for example, 200) according to the above-described embodiment is
an operation method of a control apparatus for controlling a plurality of autonomous work machines, comprising:
obtaining power information of each autonomous work machine; and
controlling each autonomous work machine based on the power information such that charging timings of the autonomous work machines at a charging station do not match each other.

According to this embodiment, by the method executed by the control apparatus functioning as a server, it is possible to avoid occurrence of a charging wait state of the autonomous work machine and improve work efficiency.

13. A control method of an autonomous work machine (for example, 10a, 10b, 10c) according to the above-described embodiment is
a control method of an autonomous work machine capable of communicating with another autonomous work machine, comprising:
obtaining power information of the autonomous work machine and power information of the other autonomous work machine; and
controlling the autonomous work machine and the other autonomous work machine based on the power information of the autonomous work machine and the power information of the other autonomous work machine such that charging timings of the autonomous work machines at a charging station do not match each other.

According to this embodiment, by the method of causing the autonomous work machine itself to communicate with the other autonomous work machine, it is possible to avoid occurrence of a charging wait state of the autonomous work machine and improve work efficiency.

14. A storage medium storing a program according to the above-described embodiment is
a storage medium storing a program configured to cause a computer to function as a control apparatus according to the present invention.

According to this embodiment, the control apparatus according to the present invention can be implemented by a computer.

15. A storage medium storing a program according to the above-described embodiment is
a storage medium storing a program configured to cause a computer to function as an autonomous work machine according to the present invention.

According to this embodiment, the autonomous work machine according to the present invention can be implemented by a computer.

According to the present invention, it is possible to avoid occurrence of a charging wait state of an autonomous work machine and improve work efficiency.

What is claimed is:

1. A control system including a charging station, a plurality of autonomous work machines, and a control apparatus configured to control the plurality of autonomous work machines, wherein the control apparatus comprises:
one or more memories storing instructions; and
one or more processors executing the instructions to:
obtain power information of each autonomous work machine; and
control each autonomous work machine based on the power information such that charging times of the autonomous work machines at the charging station do not match each other,
wherein each autonomous work machine comprises a blade for a work, and
the one or more processors of the control apparatus further execute the instructions to change the power consumption of each autonomous work machine by changing a rotation speed of the blade for each autonomous work machine.

2. The control system according to claim 1, wherein
each autonomous work machine comprises:
one or more memories storing instructions; and
one or more processors executing the instructions to:
determine whether a remaining battery amount is not more than a threshold;
if it is determined that the remaining battery amount is not more than the threshold, determine that the charging timing at the charging station has arrived; and
if it is determined that the charging timing has arrived, control the autonomous work machine to return to the charging station,
the one or more processors of the control apparatus further execute the instructions to
estimate an arrival of the charging timing of each autonomous work machine based on the power information, and
if the estimated charging times match, change the threshold to a value different for each autonomous work machine, thereby controlling each autonomous work machine such that the charging times do not match each other.

3. The control system according to claim 1, wherein the one or more processors of the control apparatus further execute the instructions to:
estimate an arrival of the charging timing of each autonomous work machine based on the power information, and
if the estimated charging times match, change power consumption of each autonomous work machine, thereby controlling each autonomous work machine such that the charging times do not match each other.

4. The control system according to claim 1, wherein the one or more processors of the control apparatus further execute the instructions to change the power consumption of each autonomous work machine by changing a traveling speed of each autonomous work machine.

5. The control system according to claim 1, wherein the one or more processors of the control apparatus further execute the instructions to change the power consumption of each autonomous work machine by changing a height of the blade for each autonomous work machine.

6. The control system according to claim 1, wherein the one or more processors of the control apparatus further execute the instructions to change the power consumption of each autonomous work machine such that remaining battery amounts of the autonomous work machines have an equal interval.

7. The control system according to claim 1, wherein the one or more processors of the control apparatus further execute the instructions to change the power consumption of each autonomous work machine by changing a work area assigned to each autonomous work machine to an area different for each autonomous work machine.

8. The control system according to claim 1, wherein
the control apparatus further comprises
a storage unit configured to store information of a work load of each work area, and
the one or more processors of the control apparatus further execute the instructions to change the power consumption of each autonomous work machine by changing the work area assigned to each autonomous work machine in accordance with the work load.

9. A control apparatus for controlling a plurality of autonomous work machines, comprising:
one or more memories storing instructions; and
one or more processors executing the instructions to:
obtain power information of each autonomous work machine; and
control each autonomous work machine based on the power information such that charging times timings of the autonomous work machines at a charging station do not match each other,
wherein each autonomous work machine comprises a blade for a work, and
the one or more processors of the control apparatus further execute the instructions to change the power consumption of each autonomous work machine by changing a rotation speed of the blade for each autonomous work machine.

10. A storage medium storing a program configured to cause a computer to function as a control apparatus defined in claim 9.

11. An autonomous work machine capable of communicating with another autonomous work machine, comprising:
one or more memories storing instructions; and
one or more processors executing the instructions to:
obtain power information of the autonomous work machine and power information of the other autonomous work machine; and
control the autonomous work machine and the other autonomous work machine based on the power information of the autonomous work machine and the power information of the other autonomous work machine such that charging times of the autonomous work machines at a charging station do not match each other,
wherein each autonomous work machine comprises a blade for a work, and
the one or more processors of the control apparatus further execute the instructions to change the power consumption of each autonomous work machine by changing a rotation speed of the blade for each autonomous work machine.

12. A storage medium storing a program configured to cause a computer to function as an autonomous work machine defined in claim 11.

13. An operation method of a control apparatus for controlling a plurality of autonomous work machines, comprising:
obtaining power information of each of the autonomous work machines;
controlling each of the autonomous work machines based on the power information such that charging times timings of the autonomous work machines at a charging station do not match each other; and
wherein each of the autonomous work machines comprises a blade for a work, and
the method further comprising changing the power consumption of each of the autonomous work machines by changing a rotation speed of the blade for each of the autonomous work machines.

14. A control method of an autonomous work machine capable of communicating with another autonomous work machine, comprising:
obtaining power information of the autonomous work machine and power information of the other autonomous work machine;
controlling the autonomous work machine and the other autonomous work machine based on the power information of the autonomous work machine and the power information of the other autonomous work machine such that charging times of the autonomous work machines, respectively, at a charging station do not match each other, and
wherein each autonomous work machine comprises a blade for a work, and
the method further comprises changing the power consumption of each autonomous work machine by changing a rotation speed of the blade for each autonomous work machine.

15. A control system including a charging station, a plurality of autonomous work machines, and a control apparatus configured to control the plurality of autonomous work machines, wherein
the control apparatus comprises:
one or more memories storing instructions; and
one or more processors executing the instructions to:
obtain power information of each autonomous work machine; and
control each autonomous work machine based on the power information such that charging times of the autonomous work machines at the charging station do not match each other,
wherein each autonomous work machine comprises a blade for a work, and
the one or more processors of the control apparatus further execute the instructions to change the power consumption of each autonomous work machine by changing a height of the blade for each autonomous work machine.

16. A control apparatus for controlling a plurality of autonomous work machines, comprising:
one or more memories storing instructions; and
one or more processors executing the instructions to:

obtain power information of each autonomous work machine; and control each autonomous work machine based on the power information such that charging times of the autonomous work machines at a charging station do not match each other, wherein each autonomous work machine comprises a blade for a work, and the one or more processors of the control apparatus further execute the instructions to change the power consumption of each autonomous work machine by changing a height of the blade for each autonomous work machine.

17. A storage medium storing a program configured to cause a computer to function as a control apparatus defined in claim 16.

18. An autonomous work machine capable of communicating with another autonomous work machine, comprising:

one or more memories storing instructions; and one or more processors executing the instructions to:

obtain power information of the autonomous work machine and power information of the other autonomous work machine; and control the autonomous work machine and the other autonomous work machine based on the power information of the autonomous work machine and the power information of the other autonomous work machine such that charging times of the autonomous work machines at a charging station do not match each other, wherein each autonomous work machine comprises a blade for a work, and the one or more processors of the control apparatus further execute the instructions to change the power consumption of each autonomous work machine by changing a height of the blade for each autonomous work machine.

19. A storage medium storing a program configured to cause a computer to function as an autonomous work machine defined in claim 18.

20. An operation method of a control apparatus for controlling a plurality of autonomous work machines, each of the autonomous work machines includes a blade to perform work, the operation method comprising:

obtaining power information of each of the autonomous work machines;

control each of the autonomous work machines based on the power information such that charging times of the autonomous work machines at a charging station do not match each other; and changing the power consumption of each autonomous work machine by changing a height of the blade for each autonomous work machine.

21. A control method of an autonomous work machine capable of communicating with another autonomous work machine, wherein the autonomous work machine and the another autonomous work machine include a blade to perform work, the control method comprising:

obtaining power information of the autonomous work machine and power information of the another autonomous work machine;

controlling the autonomous work machine and the another autonomous work machine based on the power information of the autonomous work machine and the power information of the another autonomous work machine such that charging times of the autonomous work machines at a charging station do not match each other; and changing the power consumption of each autonomous work machine by changing a height of the blade for each autonomous work machine.

* * * * *